April 21, 1931.                E. W. SCHELLENTRAGER                1,802,277
                                SELF PROPELLING DEVICE
                           Filed May 9, 1928      2 Sheets-Sheet 1
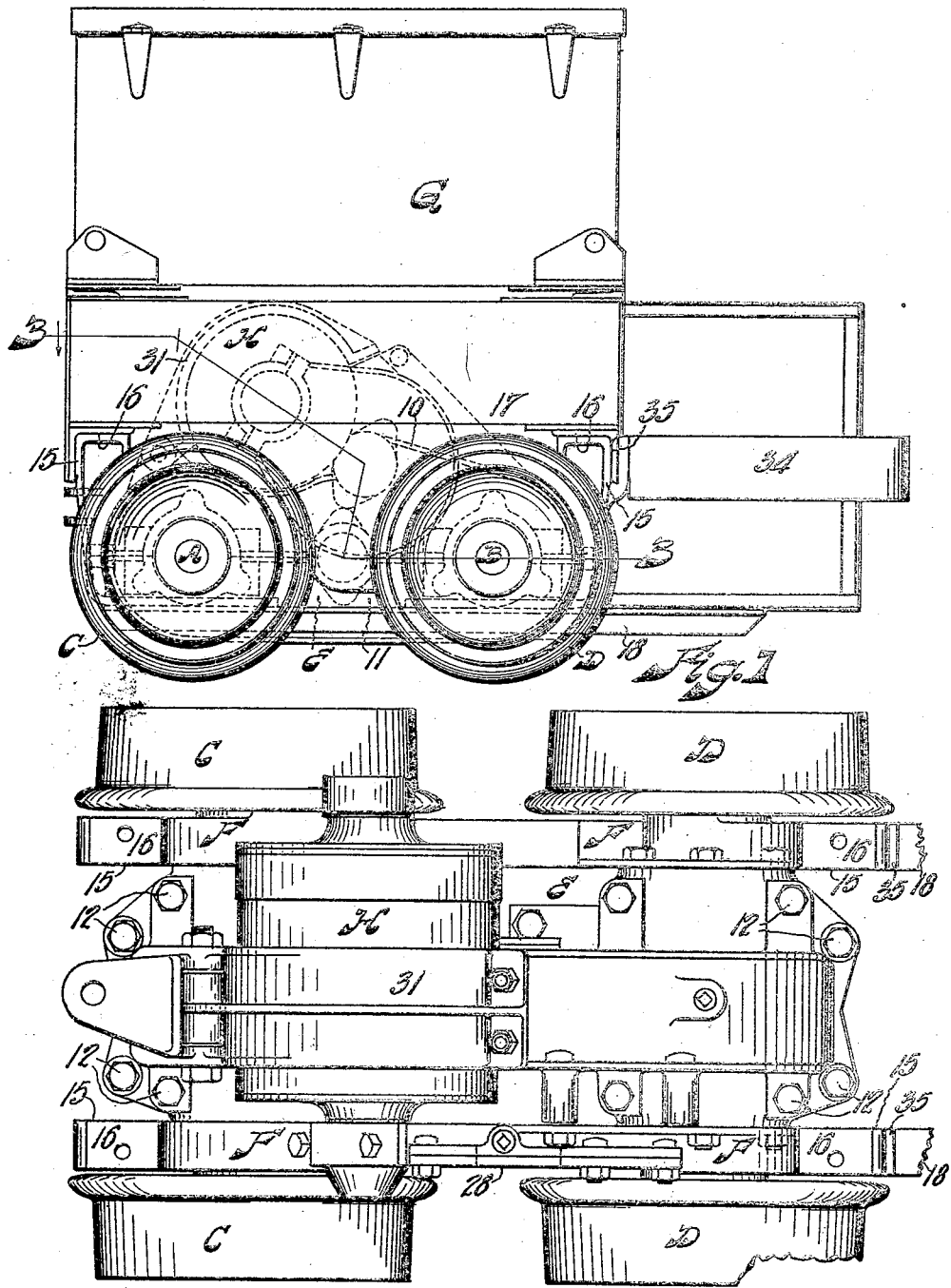

April 21, 1931.  E. W. SCHELLENTRAGER  1,802,277
SELF PROPELLING DEVICE
Filed May 9, 1928   2 Sheets-Sheet 2
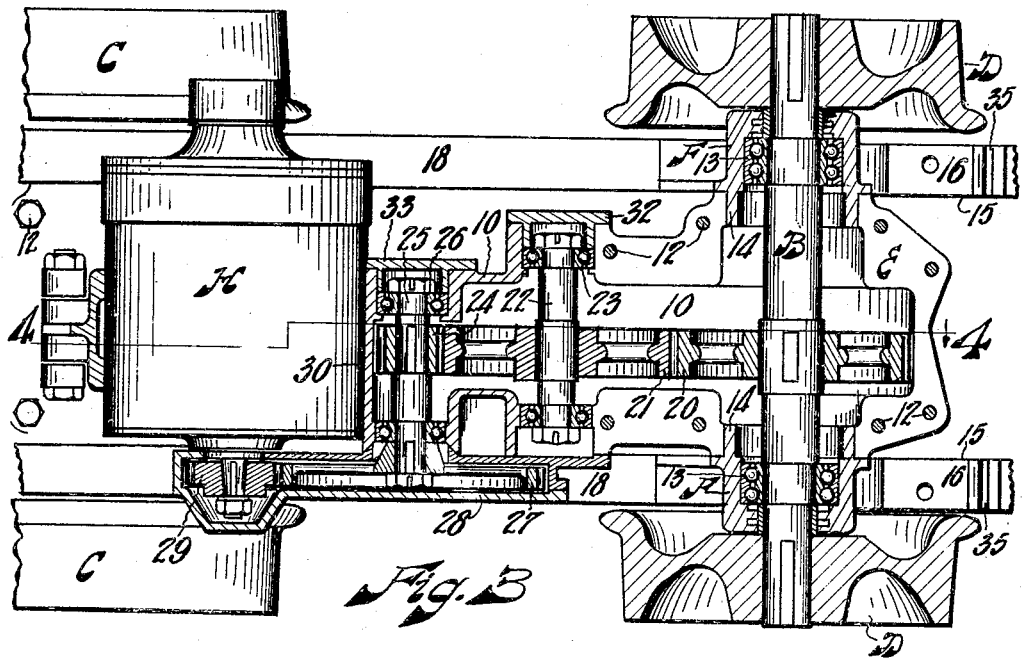
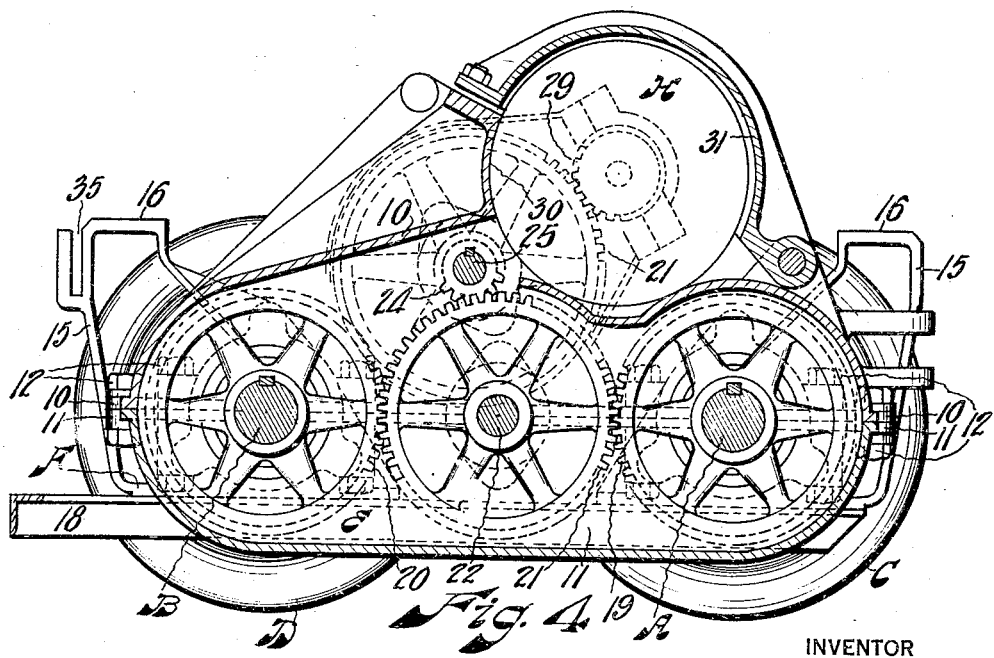
INVENTOR
E. W. Schellentrager
BY
C. F. Heinkel
ATTORNEY Patented Apr. 21, 1931

1,802,277

UNITED STATES PATENT OFFICE

EUGENE W. SCHELLENTRAGER, OF SHAKER HEIGHTS, OHIO, ASSIGNOR TO ATLAS BOLT & SCREW COMPANY, OF CLEVELAND, OHIO

SELF-PROPELLING DEVICE

Application filed May 9, 1928. Serial No. 276,226.

My invention relates to structure and relation of parts of self propelled devices.

Some objects of my invention are to reduce the width as well as the length of self propelling devices; to provide means on such devices whereby the distance between the wheels on an axle can be varied easily; to provide a means on such devices whereby different sizes or kinds of platforms can be mounted thereon; to provide such devices with means of easy access to the power means and to the speed reducing gears; to construct such devices with the least number of parts and with the least number of gears; to use the gear case as a spacing means for two axles; to provide such devices with means whereby various parts or members can be removed individually without disturbing other parts or elements; to provide such devices with means whereby the axles and wheels can easily be removed and replaced without disturbing other parts of the devices; and to provide such devices with means whereby the gear case and the power means can easily be removed and replaced on the axles either individually or together. Other objects will appear, or become obvious or apparent, or will suggest themselves upon an inspection of the accompanying drawings and the description of the particular device shown in these drawings.

In many instances it is quite desirable or necessary or advantageous to use a high gear reduction in order to reduce the speed of a power unit to a desirable speed of a self propelled device, or that such a device must be adaptable to a narrow track gauge, or that such a device must have two axles thereof spaced close together, to accommodate track conditions, or other limiting conditions, or to permit such a device to travel through a narrow space, or to permit a mechanism on such a device to be operated to better advantage such as dumping material close to the side of a track or close to the end of the device by a dumping means on the device for instance, or to have such a device of small width and length to permit the same to be carried by an elevator or hoist as in mines for instance where such devices must often be conveyed from one level to another, or to reduce the cost of production to a minimum for economical or competitive reasons as by using a minimum number of simply constructed parts for instance, or to have a device in which inspection or repairs or replacement of parts are easily accomplished, or to be able to change the track gauge of such a device with a minimum changing of parts, or to be able to change a mechanism on or carried by such a device with a minimum changing of the device.

My invention, among other features, provides all of these advantages.

In order to illustrate my invention, but not for limitation purposes nor under limitation intentions, I have selected one type of storage battery locomotive and have embodied my invention therein and have shown the same in the accompanying drawings and describe the same herein in detail but it is understood that this showing and describing is not, and is not intended to be a limitation of my invention since I am aware that my invention can be applied to devices other than the one type of locomotive shown and described.

In the accompanying drawings:—

Fig. 1 is a side view of a two axled, four wheeled, track running, electric motor driven storage battery locomotive embodying my invention and having a storage battery thereon above the power plant.

Fig. 2 is a plan view of Fig. 1 without the battery and without battery platform.

Fig. 3 is a transverse section taken in a horizontal plane indicated by the line 3—3 in Fig. 1 and shows the horizontal relations between and structures of parts or members.

Fig. 4 is a longitudinal section taken in a vertical plane indicated by the line 4—4 in Fig. 3 and shows the vertical relations between and structures of parts or members.

Similar reference characters refer to similar parts throughout the views.

The device or locomotive shown in the drawings mentioned is constructed of few parts and these parts themselves are of simple structure.

The locomotive shown comprises, principally, one pair of axles A and B, a pair of wheels C and C on the axle A, a pair of wheels D and D on the axle B, and the gear case E connecting both of the axles and thereby forming a complete chassis.

The gear case is shown split longitudinally into the two parts 10 and 11 which are fastened to each other by means of the bolts 12.

The bearing members F are shown with the ball bearings 13 mounted therein to journal the axles in the gear case and each bearing member is shown with the projection 14 entering a corresponding opening in the side of the gear case and is clamped in position by means of the bolts 12 which also serve the purpose of holding the parts 10 and 11 to each other. This structure forms a very economical chassis structure, easily assembled or disassembled by manipulation of the bolts 12, and forms a rigid chassis with the axles properly journaled therein and the journal bearings located close to the wheels.

When it is desired to change the track gauge of the wheels, the bearing members can be moved longitudinally of the axles so that the projections 14 extend more or less into the gear case or, if there is not sufficient movement for that purpose in the projections, or for other reasons it is not desirable to so move the bearing members, the bearing members can be replaced by others which meet desired conditions but the same sort of projections can be used so that the gear case need not be altered in any manner when the track gauge of the wheels is changed.

The brackets 15 are shown as extending from the bearing members and outwardly lengthwise of the locomotive and upwardly of the axles and with the flat surface 16 on the top adapted to support the platform 17 which supports the battery G. It is obvious that a platform other than the one shown, or of larger or of smaller size, or a dumping or tilting mechanism, or other mechanism or device, can be supported on these brackets, or can easily be placed thereon, or removed therefrom, or replaced by other mechanisms, or inter-changed with other mechanism; in fact, this structure permits of various kinds or sizes of mechanisms or devices to be carried by the locomotive and inter-changed thereon without any change in the locomotive itself.

The bars 18 are shown as connecting corresponding bearing members on both axles to keep the surfaces 16 in alignment and to assist the bolts 12 in preventing the bearing members from rotating.

The driving gear 19 is keyed to the axle A and the driving gear 20 is keyed to the axle B, not in mesh with each other, but located in the same plane, preferably near the center of the axles or at such a point as will equalize or otherwise distribute the traction of the wheels as desired, or for other reasons or purposes.

In order to reduce the width of the device and at the same time maintain an equal or nearly equal load and torsion or traction distribution on all drive wheels, the hereinafter described motor H and the drive gears are oppositely offset; in this instance, the gears 19 and 20 are offset to one side of the central longitudinal axis of the device and the motor H is offset to the other side of this axis.

The gear 21 meshes with both of the gears 19 and 20 and is keyed to the shaft 22 which is journaled in the ball bearings 23 mounted in the part 10 of the gear case. The pinion 24 meshes with the gear 21 and is keyed to the shaft 25 which is journaled in the ball bearing 26 also mounted in the part 10 of the gear case. The gear 27 is keyed to the shaft 25 on the outside of the gear case proper and is inclosed by the cover 28 and meshes with the pinion 29 on the power means H which is shown as an electric motor seated in the outwardly open recess 30 formed in the gear case and is held in position by the strap 31 hinged to the gear case at one end and the other end clampable onto the gear case.

This manner of mounting the power means and the holding means therefor permits the strap or holding means as well as the power means to be moved outwardly and independently or without disturbing any other part of the gear case or of the locomotive so that the power means can be deposited on the locomotive or removed from the same independently and without disturbing any other part of the locomotive except the nut on the other end of the shaft.

The plug 32 is shown extending into a suitable bore in the side of the part 10 and the inner end thereof abuts the bearing 23 and thereby holds the same in position longitudinally of the shaft 22. It is obvious that the removal of the plug 32 permits the shaft 22 to be removed from or inserted into the gear case independently of or without disturbing other parts of the locomotive except the nut on the other end of the shaft.

The plug 33 is shown extending into a suitable bore in the side of the part 10 and the inner end thereof abuts the bearing 26 and thereby holds the same in position longitudinally of the shaft 25. It is obvious that the removal of the plug 33 permits the shaft 25 to be removed from or inserted into the gear case independently of or without disturbing other parts of the locomotive.

The bars 18 are shown as extending forwardly of the front axle to support an operator's platform and the bumper 34 is shown as hooked into the slots 35 on the front brackets and as extending forwardly thereof and as removable therefrom when the bumper is in the way of anything or to further decrease the length of the locomotive.

In the locomotive shown and described, there are only six gears between the motor and the two driving axles and these gears are spaced upwardly and as close inwardly of the axles as possible to reduce the length of the locomotive to a minimum; both axles are driving axles; the gear case and the axles and the wheels form a complete chassis without requiring any other part; the track gauge of the wheels can be varied by either positioning or bodily replacing the bearing members of the gear case; the split gear case permits of easy assembling and disassembling of the chassis as well as of inspection or repairs or replacement of parts; the plugs permit of independent removal of the gear shafts without disturbing other parts of the device; the brackets permit of various devices to be carried by the locomotive; the motor can easily be installed on or removed from the gear case; the speed change gears and the motor are all mounted on one of the parts of the gear case so that the removal of that one part removes the gears and the motor for inspection or repair or replacement purposes and the removal of another part permits of inspection or repairs of the gear case and the gears and bearing members therein; the power transmission is attained by spur gears throughout between the power means and both driving axles; and the bumper is removable to still further reduce the length of the locomotive when so desired.

I am aware that my invention is applicable to devices other than the storage battery locomotive shown and described and that changes and modifications can be made in the structure as well as in the arrangement of elements shown and described within the scope of the appended claims; therefore, without limiting myself to the precise application of my invention as shown and described nor to the precise structure and arrangement of elements shown and described.

I claim:—

1. An electric storage battery locomotive including a chassis carrying axle bearings having bracket means to support the storage battery of the locomotive.

2. An electric storage battery locomotive including a chassis carrying axle bearings adjustable longitudinally of the axles of the locomotive and having bracket means to support the storage battery of the locomotive.

3. An electric storage battery locomotive including a chassis carrying axle bearings having bracket means to support the storage battery of the locomotive and bar means to align said bracket means.

4. An electric storage battery locomotive including a chassis carrying axle bearings having bracket means to support the storage battery of the locomotive and bar means to align said bracket means and to support a platform.

5. A self propelling device including a pair of axles, a bearing member for each of said axles each having an extension to support a structure, and a member connecting both of said bearing members and aligning both of said extensions.

6. A self propelling device including an axle and a gear thereon, an element carrying speed reducing gears in mesh with said gear on the axle, a replaceable bearing member for said axle localized in said element, and having an extension to support a structure.

7. A self propelling device including a pair of axles and a gear on each of said axles, an element carrying speed reducing gears in mesh with both of said gears on said axles, a replaceable bearing member for each of said axles localized in said element and each having an extension to support a structure, and a member connecting both of said bearing members and aligning both of said extensions.

8. An electric locomotive including a chassis completely inclosing the gearing of the locomotive and having a depression therein to seat the motor of the locomotive, and a strap means normally holding the motor in position and movable to permit the removal and the insertion of the motor.

9. An electric locomotive including a chassis completely inclosing the gearing of the locomotive and having a depression therein to seat the motor of the locomotive and opening obliquely to facilitate insertion and removal of the motor, and a strap means normally holding the motor in position and movable to permit the removal and the insertion of the motor.

10. An electric locomotive including a pair of axles, axle bearings on said axles, a split gear case clamped onto said bearings, a depression in the upper part of said gear case to seat the motor of the locomotive, and strap means normally holding the motor in position and movable to permit the removal and the insertion of the motor.

11. A locomotive including moving means, a pair of axles and wheels thereon and a gear case forming the chassis of the locomotive, gearing means in said gear case, and cap means on a side of said gear case and removable for inspection and removal and insertion of members of said gearing means.

12. A locomotive including moving means, a pair of axles with wheels thereon and a gear case forming the chassis of the locomotive, gearing means in said gear case, and cap means on said gear case positioning members of said gearing means and removable for inspection and removal and insertion of members of said gearing means.

13. An electric storage battery locomotive including a pair of axles with wheels thereon, axle bearings on said axles, a split gear case clamped onto said bearings, gearing means in said gear case, a depression in the upper part of said gear case, a motor seated in said depression, battery support means on said bearings, and a storage battery on said support means.

14. An electric storage battery locomotive including a pair of axles with wheels thereon, axle bearings on said axles, a split gear case clamped onto said bearings, gearing means in said gear case, a depression in the upper part of said gear case, a motor seated in said depression, battery support means on said bearings, a storage battery on said support means, and bar means to align said battery support means and to support an operator's platform.

15. An electric storage battery locomotive including a pair of axles with wheels thereon, axle bearings on said axles, a split gear case clamped onto said bearings, gearing means in said gear case, a depression in the upper part of said gear case, a motor seated in said depression, battery support means on said bearings, a storage battery on said support means, bar means to align said battery support means and to support an operator's platform, and a bumper removably supported on said battery support means.

16. A self propelling device including a pair of axles and wheels thereon, a gear case carrying a power means and connecting both of said axles and thereby forming a chassis, and means on said chassis to vary the track gauge of said wheels.

17. A self propelling device including a pair of axles and wheels thereon, a gear case carrying a power means and connecting both of said axles and thereby forming a chassis, and means on said chassis to receive various mechanisms to be carried by the device and to vary the track gauge of said wheels.

18. An electric storage battery locomotive including a chassis, storage battery supporting brackets on and extending upwardly of said chassis and a bumper movably supported on some of said brackets.

19. A self propelling device including a pair of axles and wheels thereon and a gear case carrying a power means and speed change gears and connecting both of said axles and thereby forming a chassis; said gear case being split and all of said gears mounted in one of the parts of said gear case.

20. A self propelling device including a pair of axles and wheels thereon and a gear case carrying a power means and speed change gears and connecting both of said axles and thereby forming a chassis; said gear case being split and all of said gears and said power means carried by one of the parts of said gear case.

21. A self propelling device including a pair of axles and wheels thereon, a gear case connecting both of said axles and thereby forming a chassis; gears in said gear case and mounted on shafts journaled in said gear case, and means adapted to permit said shafts to be inserted in or removed from said gear case independently of other parts of said gear case.

22. A self propelling device including a pair of axles and wheels thereon, a gear case connecting both of said axles and thereby forming a chassis, speed change gears in said gear case, said gear case being split, and all of said gears mounted in one of the parts of said gear case.

23. A self propelling device including a pair of axles and wheels thereon, a gear case connecting both of said axles and thereby forming a chassis, said gear case being split, speed reducing gears journaled in the upper part of said gear case and a power means removably mounted on the upper part of said gear case.

24. A self propelling device including a pair of axles and wheels thereon, a gear case connecting both of said axles and thereby forming a chassis, speed change gears in said gear case, said gear case being split, all of said gears mounted in one of the parts of said gear case, and a power means mounted on said one part of the gear case.

25. A self propelling device including a pair of axles and wheels thereon, a gear case connecting both of said axles and thereby forming a chassis, bracket means on said gear case adapted to support various mechanisms to be carried by the device, speed change gears in said gear case, said gear case being split, all of said gears mounted in one of the parts of said gear case, and a power means mounted on said one part of the gear case.

26. An electric motor driven locomotive having a chassis limited in width to within the over all length of the motor of the locomotive.

27. An electric motor driven locomotive having a chassis limited in width to within the over all length of the motor of the locomotive, a pair of axles and wheels thereon carried by said chassis, a drive gear on each of said axles intermediate the sides of said chassis, an intermediate gear in mesh with both of said drive gears, and gears between said intermediate gears and the motor intermediate the sides of said chassis.

28. An electric motor driven locomotive having an inclosing chassis limited in width to within the over all length of the motor of the locomotive, a pair of axles and wheels thereon carried by said chassis, a drive gear on each of said axles within said chassis, and a train of gearing between the motor and said drive gears and located within said chassis.

In testimony of the foregoing I affix my signature.

EUGENE W. SCHELLENTRAGER.